United States Patent
Holland et al.

(10) Patent No.: US 9,536,132 B2
(45) Date of Patent: Jan. 3, 2017

(54) FACILITATING IMAGE CAPTURE AND IMAGE REVIEW BY VISUALLY IMPAIRED USERS

(75) Inventors: Jerremy Holland, Los Altos Hills, CA (US); Eric Seymour, San Jose, CA (US); Chris Fleizach, Morgan Hill, CA (US); Dean Hudson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 13/247,901

(22) Filed: Sep. 28, 2011

(65) Prior Publication Data
US 2012/0327258 A1    Dec. 27, 2012

Related U.S. Application Data
(60) Provisional application No. 61/501,113, filed on Jun. 24, 2011.

(51) Int. Cl.
   *G06K 9/00* (2006.01)
   *H04N 5/232* (2006.01)
   (Continued)

(52) U.S. Cl.
   CPC ...... *G06K 9/00228* (2013.01); *H04N 1/00251* (2013.01); *H04N 5/23219* (2013.01);
   (Continued)

(58) Field of Classification Search
   CPC ............ G06K 9/00268; G06K 9/00228; H04N 1/00251; H04N 5/23219; H04N 2201/328; H04N 2101/00; H04N 2201/3276
   (Continued)

(56) References Cited

U.S. PATENT DOCUMENTS
2004/0131236 A1* 7/2004 Chen et al. .................... 382/118
2007/0003113 A1* 1/2007 Goldberg ...................... 382/118
(Continued)

FOREIGN PATENT DOCUMENTS
CN    101212572 A    7/2008
CN    101726966 A    6/2010
(Continued)

OTHER PUBLICATIONS
Chandrika Jayant et al. "Supporting Blind Photography." Proceedings of the 13th International ACM Sigaccess Conference on Computers and Accessibility, Assets. Oct. 24, 2011.
(Continued)

*Primary Examiner* — Mekonnen Dagnew
(74) *Attorney, Agent, or Firm* — Blank Rome LLP

(57) ABSTRACT

Techniques and mechanisms are provided for facilitating the capture and review of visual images by visually impaired users. In one implementation, these techniques and mechanisms provide pre image capture functionality and captured image review functionality. With the pre image capture functionality, audio messages are provided to the user to help the user position an image capturing mechanism properly to capture the desired subjects in a picture, to frame the subjects properly within the picture, to size the subjects properly within the picture, etc. With the image review functionality, audio messages are provided to the user to help the user enjoy and "visualize" a visual image that has been captured and is being displayed to the user. With these functionalities, a visually impaired user is able capture and review images to a much greater degree than is currently possible.

30 Claims, 5 Drawing Sheets

(51) Int. Cl.
*H04N 1/00* (2006.01)
*H04N 101/00* (2006.01)
(52) U.S. Cl.
CPC ... *H04N 2101/00* (2013.01); *H04N 2201/328* (2013.01); *H04N 2201/3276* (2013.01)
(58) Field of Classification Search
USPC ............... 348/222.1; 396/264; 382/118, 103
See application file for complete search history.

(56) References Cited

U.S. PATENT DOCUMENTS

| | | | |
|---|---|---|---|
| 2008/0159628 A1* | 7/2008 | Yoshida | 382/190 |
| 2008/0239104 A1* | 10/2008 | Koh | 348/240.99 |
| 2008/0273097 A1* | 11/2008 | Nagashima | G06K 9/3241 348/231.99 |
| 2009/0037477 A1* | 2/2009 | Choi et al. | 707/104.1 |
| 2009/0059061 A1* | 3/2009 | Yu et al. | 348/347 |
| 2011/0134269 A1* | 6/2011 | Kim | 348/222.1 |
| 2011/0216209 A1* | 9/2011 | Fredlund et al. | 348/211.99 |
| 2012/0098992 A1* | 4/2012 | Hosoe | 348/222.1 |

FOREIGN PATENT DOCUMENTS

| | | | |
|---|---|---|---|
| CN | 101742114 A | 6/2010 | |
| JP | 2005217768 A | * 8/2005 | |
| JP | 2005269562 A | * 9/2005 | H04N 5/225 |
| JP | 2009033544 A | 2/2009 | |
| KR | 1020110060039 A | 6/2011 | |
| WO | 2009064086 A1 | 5/2009 | |

OTHER PUBLICATIONS

Krishna et al. "A Systematic Requirements Analysis and Development of an Assistive Device to Enhance the Social Interaction of People Who are Blind or Visually Impaired." Workshop on Computer Vision Applications for the Visually Impaired Sep. 29, 2008. http://hal.inria.fr/docs/00/32/54/32/PDF/Systematic.pdf.

Chandrika Jayant. "Mobileaccessibility PortraitFramer Android Application." Sep. 26, 2012. http://code.google.com/p/mobileaccessibility/source/browse/#svn%2/Ftrunk%FPortraitFramer%2Fbin.

Samuel White et al. "EasySnap." Adjunct Proceedings of the 23rd Annual ACM Symposium on User Interface Software and Technology. Jan. 1, 2010.

Bigun et al., "Audio- and Video-Based Biometric Person Authentication", 3rd International Conference, AVBPA 2001, Halmstad, Sweden, Jun. 2001. Proceedings, Springer. ISBN 3-540-42216-1, 378 pages.

P. Viola, M Jones, Robust Real-time Object Detection, Second International Workshop on Statistical and Computational Theories of Vision—Modeling, Learning, Computing, and Sampling, Vancouver, Canada, Jul. 13, 2001, 25 pages.

P. Viola, M Jones, Robust Real-time Face Detection, International Journal of Computer Vision 57(2), Dated 2004, 18 pages.

Kirchberg, Jesorsky, Frischholz: International ECCV Workshop on Biometric Authentication, Springer, Lecture Notes in Computer Science, LNCS-2359, pp. 103-111, Copenhagen, Denmark, Jun. 2002.

Yang, Kriegman, Ahuja: Detecting Faces in Images: A Survey, IEEE Transactions on Pattern Analysis and Machine Intelligence, vol. 24, No. 1, Dated Jan. 2002, 25 pages.

W. Zhao, R. Chellappa, A. Rosenfeld, P.J. Phillips, Face Recognition: A Literature Survey, ACM Computing Surveys, Dated 2003, 61 pages.

G. Shakhnarovich, B. Moghaddam, Face Recognition in Subspaces, Handbook of Face Recognition, Eds. Stan Z. Li and Anil K. Jain, Springer-Verlag, Dated May 2004, 35 pages.

M. Turk, A. Pentland, Eigenfaces for Recognition, Journal of Cognitive Neurosicence, vol. 3, No. 1, Win. 1991, 16 pages.

R. Brunelli, T. Poggio, Face Recognition: Features versus Templates, IEEE Transactions on Pattern Analysis and Machine Intelligence, vol. 15, No. 10, Oct. 1993, 12 pages.

L.Wiskott, J.-M. Fellous, N. Krueuger, C. von der Malsburg, Face Recognition by Elastic Bunch Graph Matching, Chapter 11 in Intelligent Biometric Techniques in Fingerprint and Face Recognition, Eds. L.C. Jain et al., CRC , Press, 1999, 23 pages.

* cited by examiner

| (A) Top-Left Edge | (B) Top Edge | (C) Top-Right Edge |
|---|---|---|
| (D) Left Edge | (E) Center | (F) Right Edge |
| (G) Bottom-Left Edge | (H) Bottom Edge | (I) Bottom-Right Edge |

Fig. 5

FACILITATING IMAGE CAPTURE AND IMAGE REVIEW BY VISUALLY IMPAIRED USERS

PRIORITY CLAIM

This application claims the benefit of U.S. Provisional Application Ser. No. 61/501,113, entitled "Facilitating Image Capture and Image Review By Visually Impaired Users", filed Jun. 24, 2011, the entire contents of which are incorporated by reference herein.

BACKGROUND

Many of today's electronic devices, such as mobile phones, smart phones, tablet computers, and laptop computers have image capturing devices (e.g. cameras) that enable a user to capture a visual image using the electronic device. Once captured, the visual image can be displayed and/or edited on the electronic device, sent to another device, associated with a contact stored in the electronic device, or otherwise used by the user.

Currently, most if not all image capturing and rendering devices are designed to be used by users who are able to see. For users who are visually impaired, it is quite difficult if not impossible to effectively use an image capturing and rendering device. For example, if a visually impaired user were to try to take a picture using an image capturing device, it would be extremely difficult for the user to: (1) capture the proper subjects within the picture; (2) position the subjects in the center of the picture; (3) capture the subjects at the right distance or zoom level so that the subjects are at an appropriate size for the picture; etc. Most likely, the user would have to enlist the aid of a sighted person to help frame and size the subjects within the picture.

Similarly, it would be quite difficult if not impossible for a visually impaired user to meaningfully review and enjoy an image that is being rendered by an image rendering device. The user would have no idea how many people are in the picture, who is in the picture, where the various people are situated within the picture, etc. Again, the user would likely have to enlist the aid of a sighted person to describe the picture to him/her. Thus, as currently designed and constructed, image capturing and rendering devices are not very user friendly for visually impaired users.

BRIEF DESCRIPTION OF THE DRAWING(S)

FIG. 5 shows how a frame may be divided into a grid of nine portions, in accordance with one embodiment of the present invention.

DETAILED DESCRIPTION OF EMBODIMENT(S)

Overview

Figure 1:
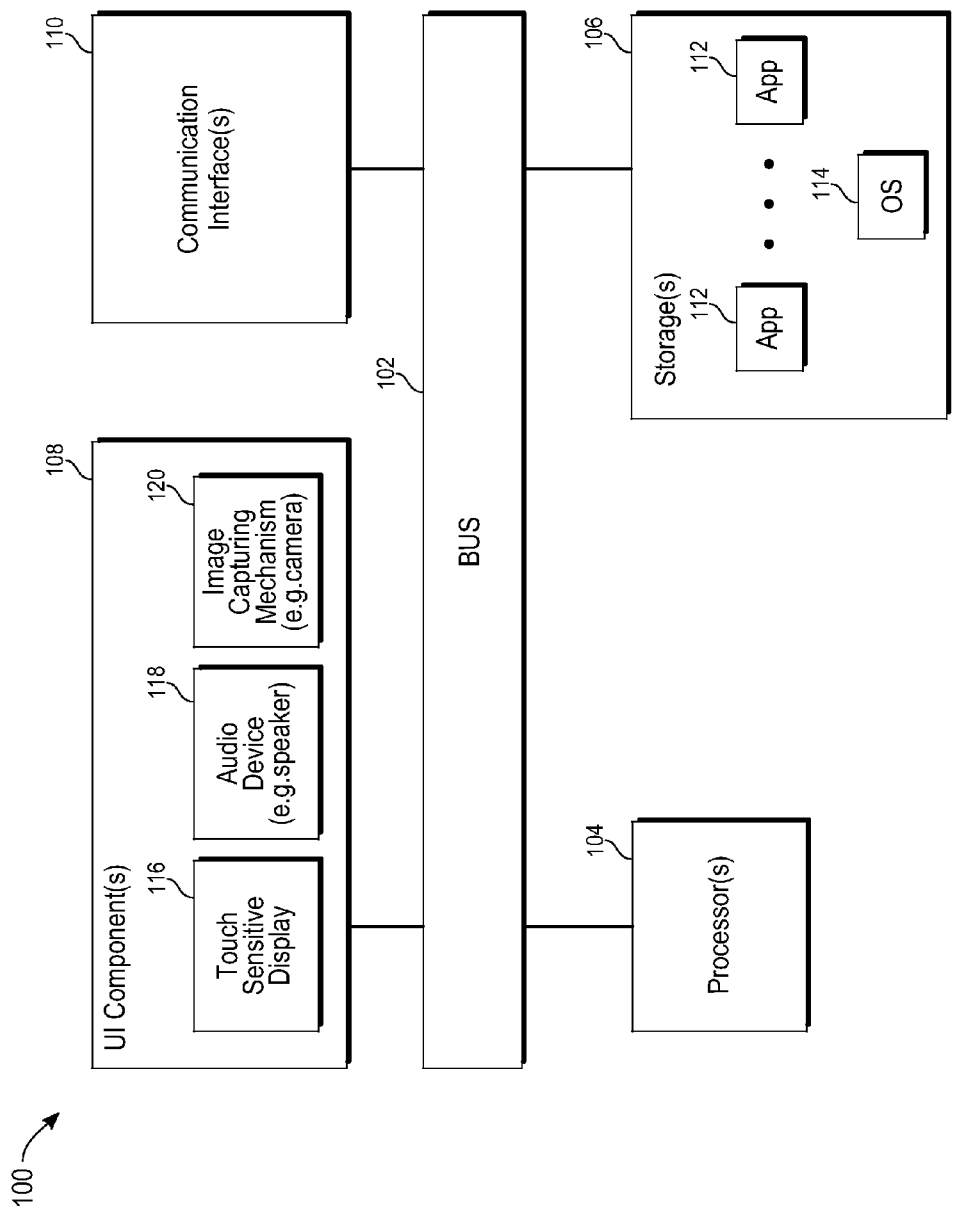
FIG. 1 shows a block diagram of a sample device in which one embodiment of the present invention may be implemented.

In accordance with one embodiment of the present invention, techniques and mechanisms are provided for facilitating the capture and review of visual images by visually impaired users. In one embodiment, these techniques and mechanisms include pre image capture functionality and captured image review functionality. With the pre image capture functionality, audio messages are provided to the user to help the user position an image capturing mechanism properly to capture the desired subjects in a picture, to frame the subjects properly within the picture, to size the subjects properly within the picture, etc. With the image review functionality, audio messages are provided to the user to help the user enjoy and "visualize" a visual image that has been captured and is being displayed.

With the pre image capture functionality, a user may direct an electronic device having an image capturing mechanism (e.g. a camera) at a scene. Periodically, or in response to user invocation of some control of the device (e.g. by touching some control or making some gesture or movement), the device pre-captures an image of the scene. After the image is pre-captured, the device analyzes the image. For example, the device may apply facial detection techniques to determine how many faces are in the image. The device may also identify the pixels that make up each face so that the location of each face within the pre-captured image is determined. In addition, the device may apply facial recognition techniques to identify the faces. Thus, rather than referring to a face in the pre-captured image as "face 1", the device may identify the face as "Zachary". Furthermore, the device may analyze the pre-captured image to determine whether any of the faces are too close to an edge (e.g. left, right, top and bottom) of the picture. The device may further analyze the pre-captured image to determine the sizes of the faces relative to the overall size of the picture.

After analyzing the pre-captured image, the device may provide one or more audio messages to the user. For example, if the image contains faces belonging to Zachary and Emily, the device may provide audio messages that say "two faces", "Zachary", "Emily". The device may also provide an audio message regarding the locations of the faces within the image. For example, if a face is too close to the left edge of the picture, the device may provide an audio message that says "face near left edge". If the faces are centered within the image, the device may provide an audio message that says "faces centered". In some instances, a face may be close to multiple edges (e.g. the top edge and the left edge). In such a case, the device may provide an audio message that says "face near top-left edge. The device may further provide an audio message regarding the sizes of the faces within the image. For example, if the faces are too small, the device may provide an audio message that says "faces are small". If, on the other hand, a face fills almost the entire image, the device may provide an audio message that says "face is full width". These and other audio messages may be provided to the user.

In response to these audio messages, the user may change the positioning of the image capturing mechanism, move closer to or farther from the subjects, adjust a zoom feature of the image capturing mechanism, etc. For example, if the user intended to capture three subjects in the picture but only two faces are currently detected, the user may reposition the image capturing mechanism to capture all three subjects. Also, if a face is too close to an edge, the user may move the image capturing mechanism to better center the subjects. Furthermore, if the faces are too small or too large, the user may move closer to or farther from the subjects, or adjust a zoom factor of the image capturing mechanism. These and other adjustments can be made by the user. After the adjustments are made, the user may wait for updated audio messages from the device (which the device will provide after pre-capturing another image and analyzing that image). Through an iterative process of making adjustments in response to audio messages from the device, the user can get the exact image that he/she desires.

As part of the adjustment process, the user may wish to know where the various subjects are positioned within the pre-captured image. In one embodiment, the device has a touch sensitive display that displays the pre-captured image. The user may touch any portion of the display, and in response to this user input, the device determines whether the portion of the pre-captured image being touched by the user corresponds to pixels that make up one of the faces in the picture. Based upon this determination, the device may provide an appropriate audio message. For example, if the portion being touched by the user does not correspond to any faces in the picture, the device may provide a beeping sound (or some other sound that is chosen by the user, or a sound that is well accepted as a sound that means "nothing", or no sound at all). On the other hand, if the touched portion corresponds to a face in the picture, the device may provide an audio message that indicates such. For example, the audio message may say "face 1", "face 2", etc. If the face was identified during the facial recognition process, the audio message may be more specific. For example, if the touched portion corresponds to Zachary's face, the audio message may say "Zachary". With this functionality, the visually impaired user is able to determine where the subjects are within the pre-captured image and how they are positioned relative to each other. This enables the user to "visualize" the image before permanently capturing it.

Once the user, based upon the audio messages from the device, is satisfied with the positioning of the image capturing mechanism relative to the subjects, the user can cause the device (e.g. by touching some control or making some gesture or movement) to permanently capture and store the image.

After the image is captured and stored, it is analyzed to derive a set of metadata. In one embodiment, this analysis is performed right after an image is permanently captured. The derived metadata is stored with the image, and may be used to enhance the user's experience when reviewing the captured image. As an example, facial detection techniques may be applied to the captured image to determine how many faces are in the image. The number of detected faces may be stored as part of the metadata for the captured image. In addition, as part of the facial detection process, the pixels that make up the faces may be identified. With this information, the locations of the faces within the picture can be specified. This pixel information may be stored as part of the metadata for the captured image. Furthermore, facial recognition techniques may be applied to identify the faces that appear in the picture. Thus, rather than just knowing that there are two faces in the picture, the device can determine, for example, that it is Zachary and Emily who are in the picture. This identification information may further be stored as part of the metadata for the captured image. These and other sets of metadata may be derived and stored with the captured image. Once the metadata is derived, it may be used by the device to provide feedback to the user. In one embodiment, after an image is permanently captured, the device provides audio feedback to the user regarding the image. For the example, the device may provide audio messages that say "two faces", "Zachary", "Emily". This audio feedback provides confirmation to the user of what image has just been captured.

At some point, the user may wish to display and review images that were previously captured. In one embodiment, when a captured image is displayed to a visually impaired user, the metadata stored with the captured image may be used to enhance the user's reviewing experience. For example, when the device displays a captured image, the device may provide an audio message indicating how many faces are in the image (e.g. "two faces"). If the metadata stored with the captured image includes identification information for the faces in the image, the device may provide audio messages that specify who is in the picture. For example, the audio messages may say "Zachary", "Emily".

After the captured image is displayed, the device may receive input indicating that the user is touching a certain portion of the image (in one embodiment, the captured image is displayed on a touch sensitive display). Using the pixel information in the metadata, the device can determine whether the portion of the image being touched by the user is part of the pixels that make up one of the faces in the picture. Based upon this determination, the device may provide an appropriate audio message. For example, if the portion being touched by the user does not correspond to any faces in the picture, the device may provide a beeping sound (or some other sound that is chosen by the user, or a sound that is well accepted as a sound that means "nothing", or no sound at all). On the other hand, if the touched portion does correspond to a face in the picture, the device may provide an audio message that indicates such. For example, the audio message may say "face 1", "face 2", etc. If the metadata includes identification information, the audio message may be more specific. For example, if the touched portion corresponds to Zachary's face, the audio message may say "Zachary". With this functionality, the visually impaired user is able to determine where the subjects are within the captured image and how they are positioned relative to each other. This enables the visually impaired user to "visualize" the image (e.g. to create a mental model of the composition and arrangement of the subjects within the image), thereby giving rise to an enriched image reviewing experience.

Sample Device

With reference to FIG. 1, there is shown a block diagram of a sample device 100 in which one embodiment of the present invention may be implemented. As shown, device 100 includes a bus 102 for facilitating information exchange, and one or more processors 104 coupled to bus 102 for executing instructions and processing information. Device 100 also includes one or more storages 106 (also referred to herein as computer readable storage media) coupled to the bus 102. Storage(s) 106 may be used to store executable programs, permanent data (e.g. captured images, metadata associated with the captured images, etc.), temporary data that is generated during program execution (e.g. pre-captured images, etc.), and any other information needed to carry out computer processing.

Storage(s) 106 may include any and all types of storages that may be used to carry out computer processing. For example, storage(s) 106 may include main memory (e.g. random access memory (RAM) or other dynamic storage device), cache memory, read only memory (ROM), permanent storage (e.g. one or more magnetic disks or optical disks, flash storage, etc.), as well as other types of storage. The various storages 106 may be volatile or non-volatile. Common forms of computer readable storage media include, for example, a floppy disk, a flexible disk, hard disk, magnetic tape, or any other magnetic medium, a CD-ROM, DVD, or any other optical storage medium, punchcards, papertape, or any other physical medium with patterns of holes, a RAM, a PROM, an EPROM, a FLASH-EPROM or any other type of flash memory, any memory chip or cartridge, and any other storage medium from which a computer can read.

As shown in FIG. 1, storage(s) 106 store at least several sets of executable instructions, including an operating system 114 and one or more applications 112. The processor(s) 102 execute the operating system 114 to provide a platform on which other sets of software may operate, and execute one or more of the applications 112 to provide additional, specific functionality. For purposes of the present invention, the applications 112 may include, for example, an image capture application, an image review application, as well as other applications. In one embodiment, the applications 112 and operating system 114 cooperate to implement the techniques described herein. That is, portions of the techniques may be performed by the applications 112 and portions may be performed by the operating system 114. It should be noted though that this is just one possible embodiment. As an alternative, all of the techniques may be performed by the operating system 114. As a further alternative, all of the techniques may be performed by one or more of the applications 112. All such possible implementations are within the scope of the present invention.

In the embodiment shown in FIG. 1, the processor(s) 104 and the executable instructions 112, 114 may be thought of as forming an image processor that implements the techniques described herein. In such an implementation, the processors(s) 104 may be thought of as being "configured" by the executable instructions 112, 114 to carry out the techniques. This is just one possible implementation for the image processor. As an alternative, the image processor may be hardware implemented using a device (e.g. a programmable logic array) having an array of elements, including logic elements, wherein the elements are programmed/configured to implement the techniques described herein. As a further alternative, the image processor may be hardware implemented by way of another device such as an application specific integrated circuit (ASIC) having elements, including logic elements, that are constructed/configured to implement the techniques described herein. Overall, the image processor may be hardware implemented using any number of devices with elements, including logic elements, that are constructed/configured to implement the techniques described herein. These and other implementations of the image processor are possible. All such implementations are within the scope of the present invention.

The device 100 further comprises one or more user interface components 108 coupled to the bus 102. These components 108 enable the device 100 to receive input from and provide output to a user. On the input side, the user interface components 108 may include, for example, a keyboard/keypad having alphanumeric keys, a cursor control device (e.g. mouse, trackball, touchpad, etc.), a touch sensitive screen capable of receiving user input, a microphone for receiving audio input, etc. On the output side, the components 108 may include a graphical interface (e.g. a graphics card) and an audio interface (e.g. sound card) for providing visual and audio content. The user interface components 108 may further include a display 116 (in one embodiment, the display 116 is a touch sensitive display) for presenting visual content, and an audio device 118 (e.g. one or more speakers) for presenting audio content. In one embodiment, the operating system 114 and the one or more applications 112 executed by the processor(s) 104 may provide a software user interface that takes advantage of and interacts with the user interface components 108 to receive input from and provide output to a user. This software user interface may, for example, provide menus that the user can navigate using one of the user input devices mentioned above, soft buttons that can be invoked via touch, a soft keyboard, etc. This software interface may also interact with the touch sensitive display 16 to receive information indicating which location(s) of the display 16 is being touched by the user and to translate this information into input that the operating system 114 and the application(s) 112 can use (e.g. to determine which portion(s) of a displayed image is being touched, which menu item or button is being invoked, etc.). These and other functions may be performed by the software user interface provided by the operating system 114 and the application(s) 112.

In one embodiment, the user interface components 108 further include one or more image capturing mechanisms 120. For purposes of the present invention, image capturing mechanism 120 may be any mechanism capable of capturing a visual image. In one embodiment, image capturing mechanism 120 takes the form of a digital camera having one or more lenses and an array of optical sensors for sensing light directed by the one or more lenses. The array of optical sensors (where each optical sensor represents a pixel) provides output signals indicative of the light sensed. The output signals from the array of optical sensors can be used to derive a captured image. For purposes of the present invention, the lens(es) of the image capturing mechanism 120 may be static or mechanically movable to implement an optical zoom.

In addition to the components set forth above, the device 100 may further comprise one or more communication interfaces 110 coupled to the bus 102. These interfaces 110 enable the device 100 to communicate with other components. The communication interfaces 110 may include, for example, a network interface (wired or wireless) for enabling the device 100 to send messages to and receive messages from a local network. The communications interfaces 110 may also include a 3G interface for enabling the device to access the Internet without using a local network. The communication interfaces 110 may further include a telephone network interface for enabling the device 100 to conduct telephone communications. The communication interfaces 110 may further include a wireless interface (e.g. Bluetooth) for communicating wirelessly with nearby devices, such as wireless headsets, earpieces, etc. The communication interfaces 110 may further comprise a jack for interfacing with a set of wired headphones, headsets, earphones, etc. These and other interfaces may be included in the device 100.

Sample Operation

With the above device description in mind, and with reference to FIGS. 1-5, the operation of device 100 in accordance with one embodiment of the present invention will now be described in greater detail. In the following description, the operations will be described as being performed by the device 100. It should be understood that, in one embodiment, the device 100 performs these operations by having the processor(s) 104 execute the operating system 114 and one or more of the applications 112, and having the processor(s) 104 interact with the various other components (e.g. display 116, audio device 118, image capturing mechanism 120, etc.).

Pre Image Capture Functionality

Figure 2:
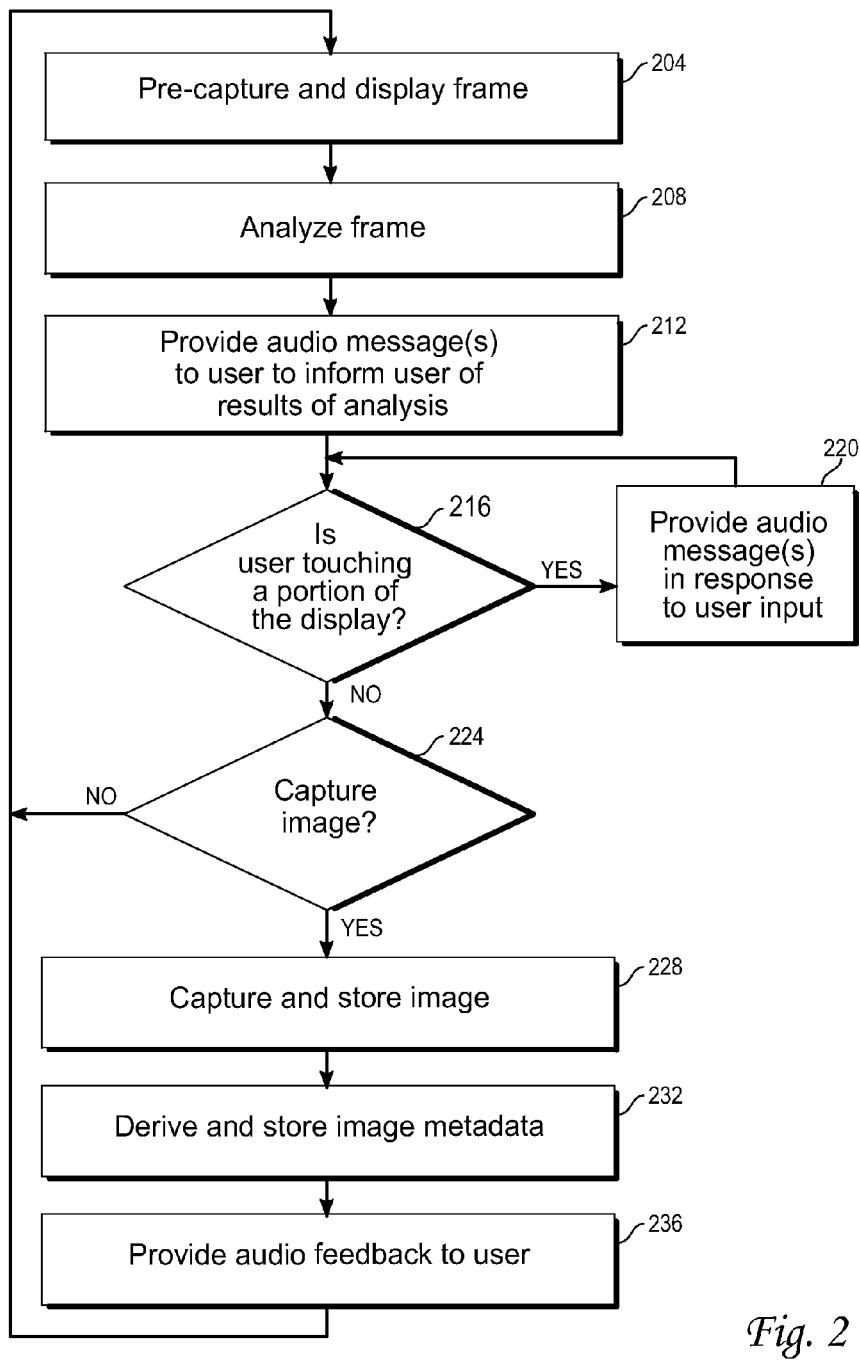
FIG. 2 shows a flow diagram of the operations performed by the device of FIG. 1 during an image capture process, in accordance with one embodiment of the present invention.

With reference to FIG. 2, there is shown a flow diagram illustrating the pre image capture operations performed by the device 100, in accordance with one embodiment of the present invention. To invoke these operations, a visually impaired user may interact with the device 100 to set some user settings to take advantage of the audio messaging capability of the device 100. The user may then invoke an application 112 (e.g. an image capture application) that takes advantage of this audio messaging capability. After that is done, the device 100 will perform the operations shown in FIG. 2.

Device 100 allows the user to direct the image capturing mechanism 120 in the general direction of a scene that the user wishes to capture. Once that is done, the device 100 pre-captures (block 204) an image of the scene using the image capturing mechanism 120. This pre-captured image is displayed on the touch sensitive display 116. In one embodiment, the device 100 pre-captures an image of a scene automatically and periodically. Alternatively, the device 100 may wait for some user input (e.g. touching some control or making some gesture or movement) before pre-capturing an image. In one embodiment, the pre-captured image is not permanently stored; rather, it is stored temporarily and used just for purposes of helping the user position/adjust the image capturing mechanism 120 properly to capture the image that the user wishes to capture. For the sake of simplicity and convenience, a pre-captured image will be referred to hereinafter as a frame.

Frame Analysis

After a frame is captured, it is analyzed (block 208) by the device 100. For purposes of the present invention, any type of image analysis may be performed on a frame. The follow discussion provides just a few examples.

One type of analysis that may be performed on a frame is facial detection. During facial detection, the device 100 processes the pixels of the frame to look for certain pixel patterns that suggest the presence of a face. For example, the device 100 may look for pixel patterns that resemble eyes, a nose, and a mouth, and determine whether these patterns are situated relative to each other in such a manner that they form a face (note: at a lower level, the device 100 may look for pixel patterns that may not be recognizable by a human as a full facial feature such as an eye, a nose, or a mouth). If certain pixel patterns are found, then a face may be detected. For purposes of the present invention, any facial detection methodology may be applied. The documents listed below describe some, but not all, of the facial detection techniques that may be used. All of these documents are incorporated by reference herein.

1. P. Viola, M Jones, Robust Real-time Object Detection, Second International Workshop on Statistical and Computational Theories of Vision—Modeling, Learning, Computing, and Sampling, Vancouver, Canada, Jul. 13, 2001, 25 pages
2. P. Viola, M Jones, Robust Real-time Face Detection, International Journal of Computer Vision 57(2), 2004, pp. 137-154
3. Fröba, Küblbeck: Audio- and Video-Based Biometric Person Authentication, 3rd International Conference, AVBPA 2001, Halmstad, Sweden, June 2001. Proceedings, Springer. ISBN 3-540-42216-1
4. Kirchberg, Jesorsky, Frischholz: International ECCV Workshop on Biometric Authentication, Springer, Lecture Notes in Computer Science, LNCS-2359, pp. 103-111, Copenhagen, Denmark, June 2002
5. Yang, Kriegman, Ahuja: Detecting Faces in Images: A Survey, IEEE Transactions on Pattern Analysis and Machine Intelligence, Vol. 24, No. 1, January 2002

In one embodiment, the device 100 performs facial detection on the entire frame to detect all of the faces in the frame. Thus, by the end of the facial detection process, the device 100 will have a count of how many faces are in the frame.

In one embodiment, as part of the facial detection process, the device 100 determines which pixels make up each face. The device 100 then stores pixel information indicating which pixels are associated with which face. In one embodiment, to minimize the amount of pixel information that needs to be stored, the device 100 approximates each face as a rectangular box. That way, the pixels associated with a face may be expressed with just a set of ranges for the x and y pixel coordinates. For example, suppose that a face encompasses a certain set of pixels. Suppose further that the leftmost pixel in the set has an x coordinate of $x_1$, the rightmost pixel in the set has an x coordinate of $x_2$, the uppermost pixel in the set has a y coordinate of $y_1$, and the lowermost pixel in the set has a y coordinate of $y_2$. In such a case, the face may be expressed as encompassing all pixels having an x coordinate between $x_1$ and $x_2$, inclusive, and a y coordinate between $y_1$ and $y_2$, inclusive. While this does not capture the exact pixels that make up the face, it is close enough, and does offer significant storage savings. With this pixel information, not only does the device 100 know how many faces are in the frame, it also knows where the faces are located within the frame.

Another type of analysis that may be performed on the frame is facial recognition. With facial recognition, each face detected in the frame is analyzed to determine whether the face belongs to a person that has already been identified to the device 100. Facial recognition may involve deriving, for each detected face, some facial characteristic values. These facial characteristic values may then be compared with facial characteristic values of known, identified faces in a database to determine whether the detected face is close enough to an identified face to conclude that the detected face belongs to the same person as the identified face. If a conclusion is made that a detected face belongs to the same person as an identified face, then the identity or name associated with the identified face may be associated with the detected face. In one embodiment, facial recognition is applied to all of the detected faces in the frame. Thus, at the end of the facial recognition process, all of the detected faces may be identified (if they belong to people who have already been identified to the device 100).

The above discussion provides just a high level description of what may be performed during the facial recognition process. For purposes of the present invention, any facial recognition methodology may be applied. The following documents describe some, but not all, of the facial recognition techniques that may be used. All of these documents are incorporated by reference herein.

1. W. Zhao, R. Chellappa, A. Rosenfeld, P. J. Phillips, Face Recognition: A Literature Survey, ACM Computing Surveys, 2003, pp. 399-458
2. G. Shakhnarovich, B. Moghaddam, Face Recognition in Subspaces, Handbook of Face Recognition, Eds. Stan Z. Li and Anil K. Jain, Springer-Verlag, December 2004, 35 pages
3. M. Turk, A. Pentland, Eigenfaces for Recognition, Journal of Cognitive Neurosicence, Vol. 3, No. 1, Win. 1991, pp. 71-86

4. R. Brunelli, T. Poggio, Face Recognition: Features versus Templates, IEEE Transactions on Pattern Analysis and Machine Intelligence, Vol. 15, No. 10, October 1993, pp. 1042-1052

5. L. Wiskott, J.-M. Fellous, N. Krueuger, C. von der Malsburg, Face Recognition by Elastic Bunch Graph Matching, Chapter 11 in Intelligent Biometric Techniques in Fingerprint and Face Recognition, Eds. L. C. Jain et al., CRC Press, 1999, pp. 355-396

Another type of analysis that may be performed on the frame is positional analysis. With positional analysis, the device 100 processes the faces detected in the frame to determine whether the pixels making up the faces are too close to one or more of the edges (e.g. left, right, top, bottom) of the frame. In one embodiment, this determination may be made by analyzing the x and y coordinates of the pixels associated with the faces. For example, to determine whether any faces are too close to the left edge of the frame, the device 100 may select the leftmost face in the frame and the leftmost x coordinate of the pixels that make up that face. The device 100 may then determine whether the separation between the left edge of the frame (having an x coordinate of 0) and the leftmost x coordinate of the face is below a certain threshold. This threshold may be set by the user or by the device 100. If so, then the leftmost face is too close to the left edge of the frame. Similarly, to determine whether any faces are too close to the right edge of the frame, the device 100 may select the rightmost face in the frame and the rightmost x coordinate of the pixels that make up that face. The device 100 may then determine whether the separation between the right edge of the frame (having an x coordinate of $x_{max}$) and the rightmost x coordinate is below the certain threshold. If so, then the rightmost face is too close to the right edge of the frame.

To determine whether any faces are too close to the top edge of the frame, the device 100 may select the uppermost face in the frame and the uppermost y coordinate of the pixels that make up that face. The device 100 may then determine whether the separation between the top edge of the frame (having a y coordinate of 0) and the uppermost y coordinate is below a particular threshold (this threshold may be the same or different than that used for the x coordinates). If so, then the uppermost face is too close to the top edge of the frame. Finally, to determine whether any faces are too close to the bottom edge of the frame, the device 100 may select the lowermost face in the frame and the lowermost y coordinate of the pixels that make up that face. The device 100 may then determine whether the separation between the bottom edge of the frame (having a y coordinate of $y_{max}$) and the lowermost y coordinate is below the particular threshold. If so, then the lowermost face is too close to the bottom edge of the frame. If no faces are too close to any of the edges of the frame, then the device 100 may conclude that the faces in the frame are centered.

In some instances, a face may be too close to multiple edges. For example, a face may be too close to the top edge as well as the left edge. In such a case, the device 100 may determine that the face is too close to both edges. The following list sets forth nine possible determinations that the device 100 may arrive at for a face, in accordance with one embodiment of the present invention (note: other determinations are possible, and are within the scope of the present invention). Specifically, the device 100 may determine that a face is:

(a) close to the top-left edge of the frame (i.e. the face is too close to both the top edge and the left edge of the frame);

(b) close to the top edge of the frame (i.e. the face is too close to just the top edge of the frame);

(c) close to the top-right edge of the frame (i.e. the face is too close to both the top edge and the right edge of the frame);

(d) close to the left edge of the frame (i.e. the face is too close to just the left edge of the frame);

(e) centered;

(f) close to the right edge of the frame (i.e. the face is too close to just the right edge of the frame);

(g) close to the bottom-left edge of the frame (i.e. the face is too close to both the bottom edge and the left edge of the frame);

(h) close to the bottom edge of the frame (i.e. the face is too close to just the bottom edge of the frame); and (i) close to the bottom-right edge of the frame (i.e. the face is too close to both the bottom edge and the right edge of the frame).

These nine possibilities may be represented as nine regions, as shown in FIG. 5. These regions (A through I) correspond to the various regions of a frame. In one embodiment, if any portion of a face is within region A of the frame, the device 100 concludes that the face is close to the top-left edge of the frame. If any portion of a face is within region C of the frame, the device 100 concludes that the face is close to the top-right edge of the frame. If any portion of a face is within region G of the frame, the device 100 concludes that the face is close to the bottom-left edge of the frame, and if any portion of a face is within region I of the frame, the device 100 concludes that the face is close to the bottom-right edge of the frame.

If a portion of a face is within region B but no portion of the face is within regions A or C, the device 100 concludes that the face is close to the top edge of the frame. If a portion of a face is within region D but no portion of the face is within regions A or G, the device 100 concludes that the face is close to the left edge of the frame. If a portion of a face is within region F but no portion of the face is within regions C or I, the device 100 concludes that the face is close to the right edge of the frame, and if a portion of a face is within region H but no portion of the face is within regions G or I, the device 100 concludes that the face is close to the bottom edge of the frame. If all faces are within region E only, the device 100 concludes that the faces are centered.

The figure shown in FIG. 5 assumes that the image capturing mechanism 120 is being held in landscape orientation (thus, the frame is captured in landscape orientation). If the frame is captured in portrait orientation instead, the same regions may still be used; however, their labels would be different. For example, suppose that the image capturing mechanism 120 (and hence, the frame) is rotated ninety degrees counter clockwise to give rise to a portrait orientation. In such a case, region C would be the top-left edge of the frame, region I would be the top-right edge, region A would be the bottom-left edge, and region G would be the bottom-right edge. In one embodiment, the device 100 detects the current orientation of the image capturing device 120, and adjusts the labels given to the regions A-I accordingly. Thus, regardless of the orientation of the image capturing mechanism 120, the device 100 will label the regions in a manner that correlates properly with what the user would expect to be left, right, top, bottom, etc.

Another type of analysis that may be performed on the frame is sizing analysis. With sizing analysis, the device 100 analyzes the size of one or more of the faces detected in the frame and determines whether the size is smaller than a certain lower threshold or larger than a certain upper threshold (these thresholds may be specified by the user or set by the device 100). If so, the device 100 may conclude that it needs to send an alert to the user that the one or more faces may be too small or too large. For purposes of the sizing analysis, the device 100 may analyze any one or more sizing metrics associated with the detected faces. For example, the device 100 may base the sizing analysis on the width of a face, the length of a face, the area of a face, etc.

In one embodiment, the device 100 uses the largest face in the frame to perform the sizing analysis. If the size of the largest face is below a certain lower threshold, then the device 100 may conclude that the faces in the frame are too small. If the size of the largest face is above a certain upper threshold, then the device may conclude that the faces in the frame are too large. Basing the sizing analysis on the largest face accounts for situations where one face in the frame may be much closer to the image capturing mechanism 120 than other faces in the frame, and hence, would be much larger than the other faces. In such a case, even though the frame may contain many faces that are smaller than the lower threshold, it would not be desirable for the device 100 to conclude that the frame contains faces that are too small. In fact, the size of the largest face (which is probably the main subject of the image) may be just right.

These and other types of analysis may be performed on the frame. In one embodiment, after the frame is analyzed, a set of metadata pertaining to the frame is stored. This metadata may include, for example, information indicating how many faces were detected in the frame, the labels or names (e.g. face 1, Zachary, etc.) assigned to the faces, the pixels that make up each face, characteristic information about each of the faces (e.g. size, color, facial characteristic values, etc.), positional information regarding the faces (e.g. whether the faces are centered, too close to an edge, etc.), sizing information about the faces (e.g. whether the faces may be too small or too large), etc. As will be elaborated upon in later sections, this metadata will be used in carrying out subsequent processing.

Audio Messages

After the frame is analyzed, the device 100 may provide (block 212) one or more audio messages, via the audio device 118, to convey the results of the analysis to the user. These audio messages may be pre recorded messages, or they may be automatically generated using text-to-speech techniques.

The audio messages may include an audio message announcing the number of faces detected in the frame. For example, if two faces are detected, then the device 100 may provide an audio message that says "two faces". If, during the facial recognition process, the faces were identified, then the device 100 may provide additional, more specific audio messages. For example, if the two faces in the frame belong to Zachary and Emily, the device 100 may provide additional audio messages that say "Zachary", "Emily". In one embodiment, the device 100 will provide these audio messages only if there is a change from a previous frame (whether there is a change from a previous frame can be determined by comparing the metadata from the current frame with the metadata from the previous frame). If a previous frame had only Zachary and Emily in it, thereby meaning that the audio messages "two faces", "Zachary", "Emily" would have previously been provided, the device 100 will not repeat these messages. However, if the current frame now contains a different number or a different set of face identities, for example, the addition of a third face belonging to Anna, then the device will provide updated audio messages (e.g. "three faces", "Zachary", "Emily", "Anna"). In some instances, some of the faces in the frame may be recognized while others are not. In such a case, the device 100 may announce the names of the recognized faces, and assign a designation to the one or more other faces (e.g. "four faces", "Zachary", "Emily", "unknown face 1", "unknown face 2").

The device 100 may also provide an audio message regarding the location of the faces within the frame. For example, if a face is too close to the left edge of the frame, the device 100 may provide an audio message that says "face near left edge". If a face is too close to both the left edge and the top edge of the frame, the device 100 may provide an audio message that says "face near top-left edge". Similar audio messages may be provided if a face is too close to the top edge, right edge, bottom edge, top-right edge, bottom-left edge, or the bottom-right edge of the frame (see FIG. 5 for the various regions of the frame). If the faces are centered within the frame, the device 100 may provide an audio message that says "faces centered" (or provide no positioning message at all).

The device 100 may further provide an audio message regarding the sizes of the faces within the frame. For example, if the faces are too small, the device 100 may provide an audio message that says "faces are small". If, on the other hand, a face fills almost the entire frame, the device may provide an audio message that says "face is full width". If the faces are neither too small nor too large, the device 100 may provide no sizing message at all (or may provide, optionally, an audio message that says "faces are properly sized").

These and other audio messages may be provided to the user. In response to these audio messages, the user may change the positioning of the image capturing mechanism 120, move closer to or farther from the subjects, adjust a zoom factor of the image capturing mechanism 120, etc. For example, if the user intended to capture three subjects but only two faces are currently detected, the user may reposition the image capturing mechanism 120 to capture all three subjects. Also, if a face is too close to an edge of the frame, the user may move the image capturing mechanism 120 to better center the subjects. Furthermore, if the faces are too small or too large, the user may move closer to or farther from the subjects, or adjust a zoom factor of the image capturing mechanism 120. These and other adjustments can be made by the user.

Responding to User Input

As part of the adjustment process, the user may wish to know where the various faces are positioned within the frame. To aid the user in this regard, the device 100 allows the user to touch the touch sensitive display 116 on which the frame is being displayed. The device 100 checks (block 216) for this user input to determine whether the user is currently touching a portion of the display 116. If no such user input is detected, the device 100 proceeds to block 224. However, if user input is detected indicating that the user is currently touching a portion of the display 116, the device 100 proceeds to provide (block 220) an appropriate audio message in response to the user input. In one embodiment, the device 100 does so by determining which portion of the touch sensitive display 116 is currently being touched. The device 100 correlates this with one or more pixels of the frame. The device 100 then determines whether these pixels correspond to pixels that make up one of the faces in the frame. Based upon this determination, the device 100 provides an appropriate audio message to the user. For example, if the portion being touched by the user does not correspond to any faces in the frame, the device 100 may provide a beeping sound (or some other sound that is chosen by the user, or a sound that is well accepted as a sound that means "nothing", or no sound at all). On the other hand, if the touched portion does correspond to a face in the frame, the device may provide an audio message that indicates such. For example, the audio message may say "face 1". If the face was identified during the facial recognition process, the audio message may be more specific. For example, if the touched portion corresponds to Zachary's face, the audio message may say "Zachary". With this functionality, the user is able to determine where the faces are within the frame and how they are positioned relative to each other. This enables the user to "visualize" the frame (e.g. to create a mental model of the composition and arrangement of the subjects) before permanently capturing an image.

In one embodiment, after providing the audio message in block 220, the device loops back to block 216 to determine whether the user is still touching the display 116. If so, the device 100 may proceed to block 220 to provide another audio message to the user. In one embodiment, the device 100 will provide another audio message only if the user input has changed (e.g. the user is touching a different portion of the display 116). With this loop, the user is able to touch the display 116, move his/her finger to various portions of the frame, and receive audio feedback on the various portions that he/she touches. In one embodiment, the device 100 performs this loop a certain number of times or for a certain period of time before proceeding to block 224.

At block 224, the device 110 checks for user input (e.g. the touching of a control or the making of a movement or gesture) indicating that the user wishes to capture a permanent image of the scene at which the image capturing mechanism 120 is directed. If no such user input is detected, the device 100 loops back to block 204 to repeat the operations described above. Thus, the process of pre capturing a frame, analyzing the frame, and providing audio feedback to the user is an iterative one. Each iteration provides updated information to help the user reposition and/or adjust the image capturing mechanism 120, move closer to or farther from the subjects, etc. By making adjustments in response to the audio messages received through this iterative process, the user can get the exact image that he/she desires.

Frame Tracking

As made clear above, the pre image capture adjustment process involves the capture and analysis of multiple frames. To prevent confusion to the user, the designation used for a face in one frame should remain the same in other frames. For example, if a face is referred to as "face 1" in one frame, that face should also be referred to as "face 1" in subsequent frames, even if that face has moved to significantly different locations in the subsequent frames. In one embodiment, to maintain this frame-to-frame consistency, the device 100 implements frame tracking. With frame tracking, the device attempts to track each face from one frame to the next. More specifically, for each face in a frame, the device 100 attempts to associate that face with a face in the immediately preceding frame. This may be done using the metadata from the current frame and metadata from the immediately preceding frame.

This association may be made based upon various factors. For example, the device 100 may associate a face in one frame with a face in a preceding frame based upon the fact that the faces have similar sizes, shapes, color, or other facial characteristics. Facial keypoints may also be used to track face movements and maintain face associations across frames (e.g. to keep track of which face is face 1 even if that face is moving). Keypoints are image features that can be selected as good points to use in tracking the motion of an object (e.g. a face). The association may also be made based upon the relative locations of the faces in the two frames. Under the assumption that a face will most likely not move very much from one frame to the next, the device 100 may associate a face in one frame with a face in a preceding frame that is relatively close in position. If an association is made between a face in a current frame and a face in a preceding frame, then the designation used for the face in the preceding frame will be used for the associated face in the current frame. Thus, the facial designation is passed from frame to frame to foster consistency.

Figure 3:
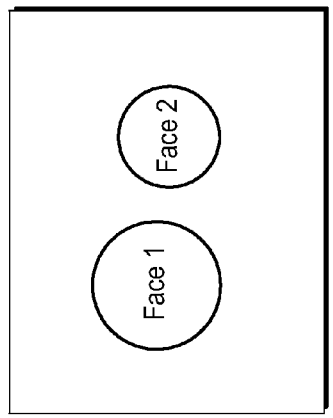
FIG. 3 illustrates an example of frame tracking, in accordance with one embodiment of the present invention.
Figure 3:
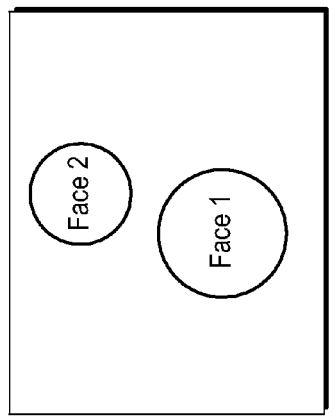
Figure 3:
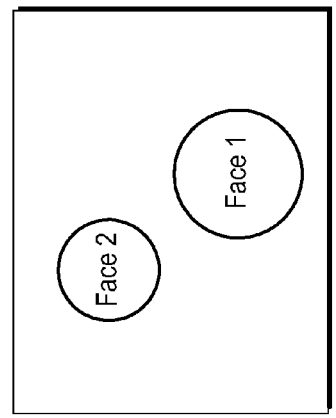
Figure 3:
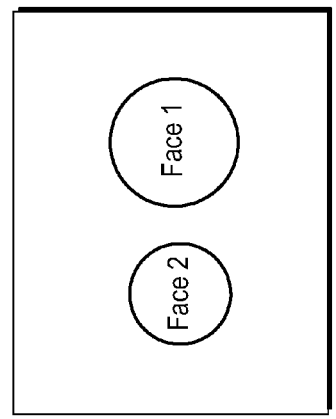

To illustrate facial tracking, reference will be made to the example of FIG. 3, which illustrates four frames. In frame 1, a larger "face 1" is on the left and a smaller "face 2" is on the right. In frame 2, the smaller face has move slightly up and to the left while the larger face has moved slightly down and to the right. Based upon a variety of factors, which may include the sizes of the faces and their relative positioning between frames 1 and 2, the device 100 continues to designate the larger face as "face 1" and the smaller face as "face 2". In frame 3, the smaller face has moved farther to the left while the larger face has moved farther to the right. Again, based upon a variety of factors, which may include the sizes of the faces and their relative positioning between frames 2 and 3, the device 100 continues to designate the larger face as "face 1" and the smaller face as "face 2". Finally, in frame 4, the smaller face has moved slightly down while the larger face has moved slightly up. Again, based upon a variety of factors, which may include the sizes of the faces and their relative positioning between frames 3 and 4, the device 100 continues to designate the larger face as "face 1" and the smaller face as "face 2". Thus, even though the two faces have completely switched positions, the device 100 knows, because of frame tracking, to still designate the larger face as "face 1" and the smaller face as "face 2". This functionality helps to prevent confusion to the user when the user listens to the audio messages provided by the device 100.

Image Capture

At some point, the user will be satisfied with the image that is in the frame. At that point, the user provides some input (e.g. the touching of a control or the making of a movement or gesture) indicating that the user wishes to capture a permanent image of the scene. This input is detected by the device 100 at block 224, and in response, the device captures (block 228) the image (using the image capturing mechanism 120) and permanently stores the image in the storage(s) 106.

In one embodiment, as soon as the permanent image is captured, the device 100 analyzes the image to derive (block 232) a set of metadata (this metadata may be referred to as face/object location and identification metadata). This metadata is thereafter stored. In one embodiment, this metadata is stored with the image (for the sake of illustration, it will be assumed in the following discussion that the metadata is stored with the image). Alternatively, the metadata may be stored in a repository (e.g. a database, a file system, etc.) and associated with the image. If the metadata for the image was already previously derived (e.g. as part of providing audio feedback to the user during the image framing process), then that metadata (which was stored) can be used as the metadata for the captured image. Otherwise, the metadata for the captured image may be freshly derived. In deriving the metadata, the device 100 may perform several functions. For example, the device 100 may apply facial detection techniques (in the manner described previously) to the captured image to determine how many faces are in the image. The number of detected faces may be stored as part of the metadata for the captured image. In addition, as part of the facial detection process, the device 100 may identify (in the manner described previously) the pixels that make up the faces in the image. With this information, the device 100 will be able to determine at a later time where the faces are located within the captured image. In addition, the device 100 may identify certain groups of pixels within the face as sub components of the face (e.g. the eyes, the nose, the mouth, etc.). All of this pixel information may be stored as part of the metadata for the captured image. Furthermore, the device 100 may apply facial recognition techniques (in the manner described previously) to identify the faces that appear in the captured image. With this information, the device 100 may be able to associate names with the faces in the captured image. This identification information may further be stored as part of the metadata for the capture image. These and other sets of metadata may be derived and stored with the captured image.

Once the metadata is derived, it may be used by the device 100. In one embodiment, immediately or shortly after the image is permanently captured, the device 100 uses the metadata to provide audio feedback (block 236) to the user regarding the captured image. For example, if the metadata indicates that the captured image has two faces belonging to Zachary and Emily, the device 100 may provide audio messages to the user that say "two faces", "Zachary", "Emily". This audio feedback provides confirmation to the user of what image has just been captured. In one embodiment, after providing this audio feedback, the device 100 loops back to block 204 to help the user prepare to capture another image.

Captured Image Review Functionality

Figure 4:
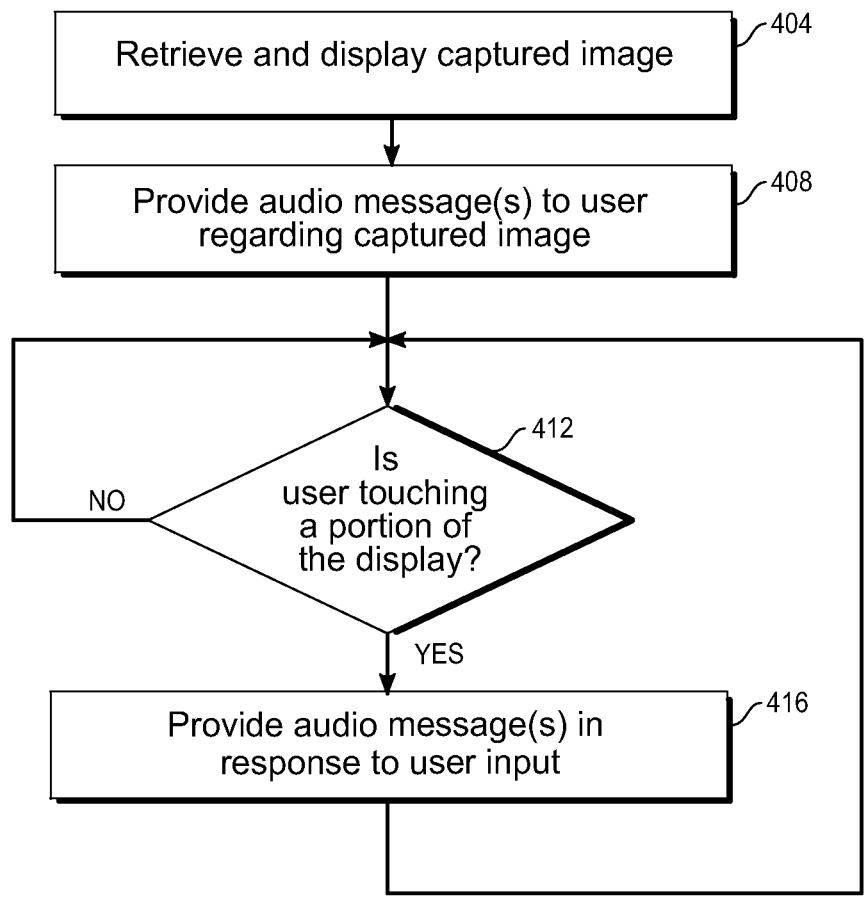
FIG. 4 shows a flow diagram of the operations performed by the device of FIG. 1 during an image review process, in accordance with one embodiment of the present invention.

At some point after an image is permanently captured and stored, the user may wish to review the image. With reference to FIG. 4, there is shown a flow diagram illustrating the operations performed by the device 100 to help the user review the image, in accordance with one embodiment of the present invention. To invoke these operations, a visually impaired user may interact with the device 100 to set some user settings (if this has not already been done) to take advantage of the audio messaging capability of the device 100. The user may then invoke an application 112 (e.g. an image review application) that takes advantage of this audio messaging capability. After that is done, the device 100 will perform the operations shown in FIG. 4.

Initially, the device 100 retrieves and displays (block 404) the captured image on the touch sensitive display 116. As part of this retrieval, the device 100 also accesses the metadata stored with the image. Based upon this metadata, the device 100 provides (block 408) one or more audio messages to the user to inform the user of the contents of the image. For example, the device 100 may provide an audio message indicating how many faces are in the image. If there are two faces in the image, the audio message may say "two faces". If the metadata stored with the captured image includes identification information for the faces in the image, the device may provide one or more audio messages specifying who is in the picture. For example, if the faces in the image belong to Zachary and Emily, the device 100 may provide audio messages that say "Zachary", "Emily". In some cases, some of the faces in the image may be recognized while others are not. In such a case, the device 100 may announce the names of the recognized faces, and assign a designation to the one or more other faces. For example, the device 100 may provide audio messages that say "Zachary", "Emily", "unknown face 1", "unknown face 2".

Other audio messages pertaining to other metadata may also be provided to the user. For example, the device 100 may provide audio messages announcing the date the image was taken, the place where the image was captured, the album with which the image is associated, etc. All of this information provides a context to help the user enjoy the image.

As part of reviewing the image, the user may wish to know where the various faces are positioned within the image. To aid the user in this regard, the device 100 allows the user to touch the touch sensitive display 116 on which the image is being displayed. The device 100 checks (block 412) for this user input to determine whether the user is currently touching a portion of the display 116. If no such user input is detected, the device 100 loops and continues to check for user input. However, if user input is detected indicating that the user is currently touching a portion of the display 116, the device 100 proceeds to provide (block 416) an appropriate audio message in response to the user input. In one embodiment, the device 100 does so by determining which portion, and hence, which pixels of the image are currently being touched by the user. The device 100 then determines whether these pixels correspond to pixels that make up one of the faces in the picture. This determination may be made using the pixel metadata that was stored with the image (this pixel metadata specifies the pixels that make each of the faces in the image). Based upon this determination, the device 100 provides an appropriate audio message to the user. For example, if the portion being touched by the user does not correspond to any faces in the frame, the device 100 may provide a beeping sound (or some other sound that is chosen by the user, or a sound that is well accepted as a sound that means "nothing", or no sound at all). On the other hand, if the touched portion does correspond to a face in the frame, the device may provide an audio message that indicates such. For example, the audio message may say "unknown face 1". If the face was identified during the facial recognition process, the audio message may be more specific. For example, if the touched portion corresponds to Zachary's face, the audio message may say "Zachary". Furthermore, if the touched portion of the face corresponds to one of the sub components of the face (e.g. eyes, nose, mouth, etc.), the device may provide audio messages that are even more specific. For example, if the touched portion corresponds to Zachary's mouth, the device 100 may provide audio messages that say "Zachary", "mouth". With this functionality, the user is able to determine where the faces are within the image and how they are positioned relative to each other. This enables the user to "visualize" the image.

In one embodiment, after providing the audio message in block 416, the device 100 loops back to block 412 to determine whether the user is still touching the display 116. If so, the device 100 may proceed to block 416 to provide another audio message to the user. In one embodiment, the device 100 will provide another audio message only if the user input has changed (e.g. the user is touching a different portion of the display 116). With this loop, the user is able to touch the display 116, move his/her finger to various portions of the image, and receive audio feedback on the various portions that he/she touches. With this functionality, the visually impaired user is able to determine where the faces are within the captured image and how they are positioned relative to each other. This enables the user to "visualize" the image (e.g. to create a mental model of the composition and arrangement of the subjects within the image), thereby giving rise to an enriched image reviewing experience.

Audio feedback may be provided to the user not just during image review but also in other contexts as well. For example, audio feedback may be provided to the user while the user is editing, not just reviewing, an image. For example, if the user is interacting with a cropping adjustment, audio messages may be provided to inform the user that the number of faces has changed (e.g. as a result of the cropping operation, there are now fewer faces in the image than before). Overall, all of the audio messages provided during the pre image capture process may be provided during an editing/cropping process. Use of the audio feedback in these and other contexts are within the scope of the present invention.

In the above discussion, it is assumed that the image being reviewed by the user is one that was captured using device 100; hence, face/object location and identification metadata for the image has been generated and stored. However, there may be circumstances in which the image may not have any face/object location and identification metadata. For example, the image may be one that was received without any such metadata or was captured using a device that does not generate such metadata. If the image does not have any associated face/object location and identification metadata, the device 100 may analyze the image in the manner described previously (e.g. using facial detection and recognition analysis) to generate the face/object location and identification metadata on-demand. Once derived, the metadata may be used by the device 100 to provide audio feedback to the user, in the manner described above.

Modifications/Enhancements

In the above description, the detection and recognition techniques are applied to detect and recognize faces. It should be noted that the present invention is not so limited. Rather, the detection and recognition techniques may be applied to detect and identify other items as well, such as the bodies attached to the faces, other objects and regions (e.g. houses, cars, trees, sky, grass, etc.) in the image, etc. Also, the detection and recognition may be extended to any desired granularity. For example, they may be used not just to detect the bodies attached to the faces, but also to differentiate the torso of the body from the legs and the arms, to differentiate the fingers from the arms, etc. In addition, the pixel information that is gathered and stored may be much more detailed. With more detailed pixel information, and with more audio messages narrating the pixel information, the user can obtain more information when he/she touches the touch sensitive display on which an image is displayed. For example, when the user touches a portion of the image that shows a tree, the device 100 may say "tree". When the user touches a region such as sky or grass, one or more audio messages may be played to allow the user to hear about these elements while exploring the image. When the user touches a portion corresponding to Zachary's arm, the device 100 may say "Zachary's arm". By tracing the location of the arm, the user may be able to discern whether the arm is raised or lowered, whether the fingers at the end of the arm are making a "peace" sign, etc. With this additional detail, the user can get a clearer idea of the setting in which the image was captured and what the subjects in the image are doing. These and other modifications and enhancements may be made, and are within the scope of the present invention.

In the foregoing specification, embodiments of the present invention have been described with reference to numerous specific details that may vary from implementation to implementation. Thus, the sole and exclusive indicator of what is the invention, and is intended by the Applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A device, comprising:
   an image capturing mechanism; and
   an image processor coupled to the image capturing mechanism, wherein the image processor is configured to cause the device to perform operations comprising:
   capturing an image of a scene that includes one or more faces, wherein the one or more faces comprise a first particular face;
   analyzing the image, wherein analyzing the image comprises:
   detecting the one or more faces in the image,
   performing facial recognition to obtain identification information for at least one of the one or more faces; and
   providing one or more audio messages including the obtained identification information for the at least one of the one or more faces;
   capturing a subsequent image of the scene that includes the first particular face;
   detecting the first particular face in the subsequent image;
   associating the first particular face in the initial image with the first particular face in the subsequent image; and
   associating a designation assigned to the first particular face in the initial image with the first particular face in the subsequent image so that the same designation is used for the first particular face across multiple images.

2. The device of claim 1, wherein providing one or more audio messages comprises providing an audio message indicating how many faces are detected in the image.

3. The device of claim 1, wherein analyzing the image further comprises determining how the at least one of the one or more faces are positioned relative to one or more edges of the image, and wherein providing one or more audio messages comprises providing an audio message indicating how the at least one of the one or more faces are positioned relative to the one or more edges of the image.

4. The device of claim 3, wherein providing an audio message indicating how the at least one of the one or more faces are positioned relative to one or more edges of the image comprises providing an audio message indicating that the at least one of the one or more faces are close to one or more of the one or more edges of the image.

5. The device of claim 3, wherein providing an audio message indicating how the at least one of the one or more faces are positioned relative to one or more edges of the image comprises providing an audio message indicating that the at least one of the one or more faces are within a central portion of the image.

6. The device of claim 3, wherein determining how the at least one of the one or more faces are positioned relative to one or more edges of the image comprises determining whether a separation between a second particular face of the at least one of the one or more faces and a particular edge of the one or more edges of the image is below a threshold.

7. The device of claim 1, wherein analyzing the image comprises determining a size for at least a second particular face of the at least one of the one or more faces, and wherein providing one or more audio messages comprises providing an audio message indicating the size of the second particular face.

8. The device of claim 7, wherein determining the size of the second particular face comprises determining whether the size of the second particular face is smaller than a lower threshold or larger than an upper threshold, and wherein providing an audio message indicating the size of the second particular face comprises providing one of the following:
an audio message indicating that the second particular face is smaller than the lower threshold; or an audio message indicating that the second particular face is larger than the upper threshold.

9. The device of claim 1, wherein the image is an initial temporary image that is not stored as a permanent image, and wherein the image processor is configured to cause the device to further perform operations comprising:
capturing a subsequent temporary image of the scene after the user has made scene framing adjustments in response to the one or more audio messages, wherein the subsequent temporary image is not stored as a permanent image;
analyzing the subsequent temporary image by detecting one or more faces in the subsequent temporary image;
providing one or more audio messages with information pertaining to the one or more faces in the subsequent temporary image;
detecting input indicating a request to capture a permanent image of the scene as currently framed; and
in response to the input, capturing the permanent image of the scene as currently framed.

10. The device of claim 1, wherein the image processor comprises one or more processors and one or more storages storing instructions which, when executed by the one or more processors, cause the one or more processors to cause the device to perform the operations.

11. The device of claim 1, wherein the image processor comprises a plurality of elements, including logic elements, that are configured to cause the device to perform the operations.

12. A non-transitory computer readable storage medium storing instructions which, when executed by one or more processors of a device, cause the device to perform operations comprising:
capturing an image of a scene that includes one or more faces, wherein the one or more faces comprise a first particular face;
analyzing the image by detecting the one or more faces in the image;
performing facial recognition to obtain identification information for at least one of the one or more faces;
providing one or more audio messages including the obtained identification information for the at least one of the one or more faces;
capturing a subsequent image of the scene that includes the first particular face;
detecting the first particular face in the subsequent image;
associating the first particular face in the initial image with the first particular face in the subsequent image; and associating a designation assigned to the first particular face in the initial image with the first particular face in the subsequent image so that the same designation is used for the first particular face across multiple images.

13. The non-transitory computer readable storage medium of claim 12, wherein providing one or more audio messages comprises providing an audio message indicating how many faces are detected in the image.

14. The non-transitory computer readable storage medium of claim 12, wherein analyzing the image comprises determining a size for at least a second particular face of the one or more faces, and wherein providing one or more audio messages comprises providing an audio message indicating the size of the second particular face.

15. The non-transitory computer readable storage medium of claim 14, wherein determining the size of the second particular face comprises determining whether the size of the second particular face is smaller than a lower threshold or larger than an upper threshold, and wherein providing an audio message indicating the size of the second particular face comprises providing one of the following:
an audio message indicating that the second particular face is smaller than the lower threshold; or
an audio message indicating that the second particular face is larger than the upper threshold.

16. The non-transitory computer readable storage medium of claim 12, wherein the instructions cause the device to further perform operations comprising:
detecting touch input at a particular portion of an input mechanism;
correlating the particular portion of the input mechanism with a certain portion of the image;
determining whether the certain portion of the image corresponds to one of the one or more faces; and
providing, in response to a determination that the certain portion of the image corresponds to one of the one or more faces, one or more audio messages with information pertaining to the face to which the certain portion of the image corresponds.

17. An apparatus, comprising:
a camera;
an audio device;
an image processor coupled to the camera and the audio device, wherein the image processor is configured to cause the apparatus to perform operations comprising:
capturing an image of a scene that includes one or more faces,
detecting the one or more faces in the image,
determining whether the one or more faces are less than a threshold distance from one or more edges of the image, and
providing, in response to a determination that the one or more faces are less than a threshold distance from the one or more edges of the image, an audio message indicating that the one or more faces are close to one or more of the one or more edges of the image; and
a touch sensitive input mechanism configured to cause the apparatus to further perform operations comprising:
detecting that the user is touching a particular portion of the input mechanism;
correlating the particular portion of the input mechanism with a certain portion of the image;
determining the certain portion of the image corresponds to one of the one or more faces;
performing facial recognition to identify the one of the one or more faces; and in response to identifying the one of the one or more faces, providing an audio message including identification information pertaining to the face to which the certain portion of the image corresponds.

18. The apparatus of claim 17,
wherein determining whether the one or more faces are less than a threshold distance from one or more of the one or more edges of the image comprises:
determining which particular edge or edges of the image the one or more faces are less than the threshold distance from, and
wherein providing an audio message indicating that the one or more faces are close to one or more of the one or more edges of the image comprises:
specifying the particular edge or edges in the audio message.

19. The apparatus of claim 17, wherein the image processor is configured to cause the apparatus to further perform operations comprising:
in response to a determination that the one or more faces are not less than a threshold distance from any of the one or more edges of the image, providing an audio message indicating that the one or more faces are within a central portion of the image.

20. The apparatus of claim 17, wherein the image processor is configured to cause the apparatus to further perform operations comprising:
determining a size for at least a particular face of the one or more faces; and
providing an audio message indicating the size of the particular face.

21. The apparatus of claim 20,
wherein determining the size of the particular face comprises:
determining whether the size of the particular face is smaller than a lower threshold or larger than an upper threshold, and
wherein providing an audio message indicating the size of the particular face comprises providing one of the following:
an audio message indicating that the particular face is smaller than the lower threshold; or
an audio message indicating that the particular face is larger than the upper threshold.

22. A non-transitory computer readable storage medium storing instructions which, when executed by one or more processors of a device, cause the device to perform operations comprising:
capturing an image of a scene that includes one or more faces;
detecting the one or more faces in the image;
determining whether the one or more faces are less than a threshold distance from one or more edges of the image;
performing facial recognition to identify at least one of the one or more faces in response to a determination that the at least one of the one or more faces is less than a threshold distance from the one or more edges of the image; and
providing, in response to identifying the at least one of the one or more faces, an audio message including information identifying the at least of the one or more faces and indicating that the at least one of the one or more faces is close to one or more of the one or more edges of the image.

23. The non-transitory computer readable storage medium of claim 22, wherein determining whether the at least one of then one or more faces is less than a threshold distance from one or more edges of the image comprises:
determining which particular edge or edges of the one or more edges of the image the at least one of the one or more faces is less than the threshold distance from, and
wherein providing an audio message indicating that the at least one of the one or more faces is close to the particular edge or edges of the one or more edges of the image comprises:
specifying the particular edge or edges in the audio message.

24. The non-transitory computer readable storage medium of claim 22, wherein the instructions cause the device to further perform operations comprising:
in response to a determination that the at least one of the one or more faces is not less than a threshold distance from any of the one or more edges of the image, providing an audio message indicating that the at least one of the one or more faces is within a central portion of the image.

25. The non-transitory computer readable storage medium of claim 22, wherein the instructions cause the device to further perform operations comprising:
determining a size of at least a particular face of the one or more faces; and
providing an audio message indicating the size of the particular face.

26. The non-transitory computer readable storage medium of claim 25, wherein determining the size of at least the particular face comprises:
determining whether the size of the particular face is smaller than a lower threshold or larger than an upper threshold, and
wherein providing an audio message indicating the size of the particular face comprises providing one of the following:
an audio message indicating that the particular face is smaller than the lower threshold; or
an audio message indicating that the particular face is larger than the upper threshold.

27. The non-transitory computer readable storage medium of claim 22, wherein the instructions cause the device to further perform operations comprising:
detecting touch input at a particular portion of the input mechanism;
correlating the particular portion of the input mechanism with a certain portion of the image;
determining whether the certain portion of the image corresponds to one of the one or more faces; and
providing, in response to a determination that the certain portion of the image corresponds to one of the one or more faces, one or more audio messages with information pertaining to the face to which the certain portion of the image corresponds.

28. An apparatus comprising:
a camera;
an audio device; and
an image processor coupled to the camera and the audio device, wherein the image processor is configured to cause the apparatus to perform operations comprising:
capturing an image of a scene that includes one or more faces;
detecting the one or more faces in the image;
providing one or more audio messages indicating how many faces are detected in the image;
performing facial recognition to identify at least one of the one or more faces;

providing an audio message including identification information pertaining to the at least one of the one or more faces;

determining how the one or more faces are positioned relative to one or more edges of the image;

providing one or more audio messages indicating how the one or more faces are positioned relative to one or more of the one or more edges of the image;

determining a size for a least a particular face of the one or more faces; and providing an audio message indicating the size of the particular face.

29. The apparatus of claim 28, wherein the apparatus further comprises a touch sensitive input mechanism, and wherein the image processor is configured to cause the apparatus to further perform operations comprising:

detecting touch input at a particular portion of the input mechanism;

correlating the particular portion of the input mechanism with a certain portion of the image;

determining whether the certain portion of the image corresponds to one of the one or more faces; and providing, in response to a determination that the certain portion of the image corresponds to one of the one or more faces, one or more audio messages with information pertaining to the face to which the certain portion of the image corresponds.

30. The device of claim 1, further comprising a touch sensitive input mechanism, and wherein the image processor is configured to cause the device to further perform operations comprising:

detecting touch input at a particular portion of the input mechanism;

correlating the particular portion of the input mechanism with a certain portion of the image;

determining whether the certain portion of the image corresponds to one of the one or more faces; and providing, in response to a determination that the certain portion of the image corresponds to one of the one or more faces, one or more audio messages with information pertaining to the face to which the certain portion of the image corresponds.

* * * * *

UNITED STATES PATENT AND TRADEMARK OFFICE
CERTIFICATE OF CORRECTION

PATENT NO. : 9,536,132 B2
APPLICATION NO. : 13/247901
DATED : January 3, 2017
INVENTOR(S) : Jerremy Holland et al.

It is certified that error appears in the above-identified patent and that said Letters Patent is hereby corrected as shown below:

In the Claims

Column 21, Line 62: insert the word --one-- after the phrase "at least".

Column 22, Line 1: delete the word "then" and insert the word --the--.

Signed and Sealed this
Thirteenth Day of June, 2017

Joseph Matal
*Performing the Functions and Duties of the
Under Secretary of Commerce for Intellectual Property and
Director of the United States Patent and Trademark Office*